United States Patent [19]

Yuasa et al.

[11] 4,364,662

[45] Dec. 21, 1982

[54] DUAL MODE CAMERA EXPOSURE METERS

[75] Inventors: Yoshio Yuasa, Kawachinagano; Toru Kisanuki, Toyokawa; Susumu Shirai, Toyohashi, all of Japan

[73] Assignee: Minolta Camera Kabushiki Kaisha, Osaka, Japan

[21] Appl. No.: 150,643

[22] Filed: May 16, 1980

[30] Foreign Application Priority Data

Jun. 5, 1979 [JP] Japan ............................. 54-76928[U]

[51] Int. Cl.³ .............................................. G01J 1/44
[52] U.S. Cl. .................................................... 356/225
[58] Field of Search .............................. 356/218–228

[56] References Cited

U.S. PATENT DOCUMENTS 2,389,617 11/1945 Freund ................................ 356/224
2,766,654 10/1956 Stimson et al. .................... 356/224
3,697,179 10/1972 Pfaffenberger et al. ............ 356/224

OTHER PUBLICATIONS

Minolta System Handbook; SR-T101; SR-T100; SR-M, Joseph D. Cooper; 1972; pp. V-52 to V-63.

Primary Examiner—Bruce Y. Arnold
Attorney, Agent, or Firm—Watson, Cole, Grindle & Watson

[57] ABSTRACT

With an exposure meter usable in both reflected light mode and incident light mode, the exposure meter is capable of displaying a value measured in reflected light mode with a reflected light mode attachment mounted on the exposure meter, and a value measured in incident light mode with an incident light mode attachment mounted thereon.

8 Claims, 7 Drawing Figures

DUAL MODE CAMERA EXPOSURE METERS

BACKGROUND OF THE INVENTION

1. Field of the Invention

The present invention relates to camera exposure meters and in particular to such exposure meters usable in both a reflected light mode and an incident light mode.

2. Description of the Prior Art

Prior art exposure meters usable in both a reflected light mode and an incident light mode are basically of the incident light type. Such exposure meters are provided with a conversion table determined by assuming an average reflectance of an ordinary object for use in the reflected light mode. When the exposure meter is used in the incident light mode, an incident light mode attachment is mounted on the exposure meter and a correct exposure value is obtained by direct display readouts from the exposure meter. When use in the reflected light mode, the attachment is exchanged for a reflected light mode attachment and a correct exposure value is obtained by converting the displayed value according to the conversion table. Accordingly, when used in the reflected light mode, prior art exposure meters of this type pose a drawback, wherein the correct exposure value is unobtainable unless the conversion table is used in the reflected light mode, thereby taking much time to obtain an exposure value, and furthermore, a wrong value may be used as a correct exposure value when the conversion table is not used or is misinterpreted.

Moreover, with another type of prior art exposure meter, a rotatable plate, on which a plurality of display values corresponding to the values measured by the exposure meter are printed, is rotatably provided. The angle of rotation of the plate is determined by the exposure information to be displayed. Over the rotatable plate is a display plate with a display window therein for readout of values on the rotatable plate. A user of the exposure meter manually switches the position of the display window according to the use of the exposure meter in a reflected light mode or an incident light mode. This type of exposure meter, however, like the aforementioned prior art device, poses a drawback in that a wrong value may be obtained for a correct exposure value when the position of the display window is not switched.

SUMMARY OF THE INVENTION

The principal object of the present invention is to provide an exposure meter capable of directly reading the exposure information without fall in both a reflected light mode and an incident light mode.

In accordance with the invention an exposure meter is usable as both an incident light meter and a reflected light meter by selected use of an incident-light measuring attachment and a reflected-light measuring attachment. The object light passing through the selected attachment is detected and processed to obtain exposure information, which exposure information is indicated to the camera operator. Signals are generated within the electrical circuitry in dependence upon the particular attachment mounted to the exposure meter for automatically selecting between an indication by incident-light measuring mode and indication by reflected light measuring mode. Exposure information for incident light measuring is provided when the incident-light measuring attachment is mounted, and exposure information by reflected light measuring is provided when the reflected light measuring attachment is mounted.

DETAILED DESCRIPTION OF THE PREFERRED EMBODIMENTS

In general, a reflected light type exposure meter measures light reflected from an object. In this condition, the exposure meter obtains the brightness B(t) of the object, and determines therefrom a number of parameters A, T and Sx in accordance with the following equation.

$$\frac{1}{A^2} \int_0^T B(t)dt = \frac{K}{Sx} \quad (1)$$

Wherein, A denotes an F-number of an objective, T is an exposure time, Sx is the film sensitivity, and K is a calibration constant of a reflected light type exposure meter.

Assuming that the surfaces of the object are of a complete diffusion type, Lambert's Law is applicable and the relationship between illuminance I(t) and brightness B(t) of the object are as follows:

$$B(t) = \frac{P}{\pi} I(t) \quad (2)$$

Wherein, P denotes the reflectance of the object. Substituting equation (2) for equation (1) the following basic equation is obtained for an incident light type exposure meter.

$$\frac{1}{A^2} \int_0^T I(t)dt = \frac{\pi}{P} \cdot \frac{K}{Sx} \frac{C}{Sx} \quad (3)$$

C denotes a calibration constant of the incident light type exposure meter. Accordingly, an incident light type exposure meter measures incident light at the position of an object to be photographed and determines the illuminance I(t) of the object; then a combination of A, T and Sx from illuminance I(t), to fulfill equation (3).

As is apparent from equation (2), illuminance I(t) and brightness B(t) of the same object differ even when the same light source is used under the same conditions. (The ratio thereof depends on reflectance P of the object.)

Accordingly, in order to avoid an error in reading correct exposure meter values in either a reflected light mode or an incident light mode, a correct exposure value based on light measurement in the reflected light mode are displayed when the exposure meter is used in that light mode; and a correct exposure value based on light measurement in the incident light mode is displayed in that light mode.

Figure 1A:
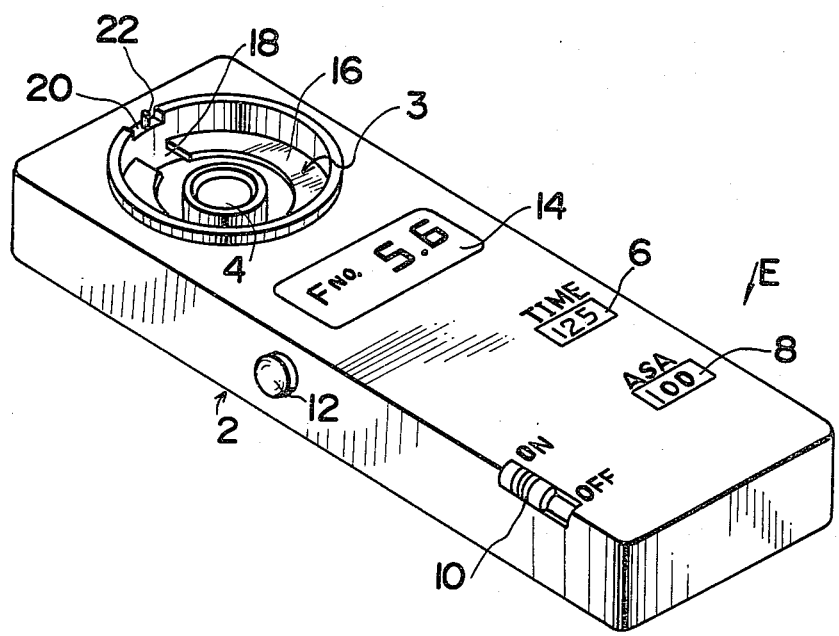
FIG. 1A is a perspective view of an exposure meter according to an embodiment of the present invention.

With respect to FIG. 1A, exposure meter 2 is provided with light receiving part 3 having photosensitive element 4; exposure time display window 6 for displaying an exposure time set by manual operation member 5 (shown in FIG. 1D); film sensitivity display window 8 for displaying the film sensitivity set by manual operation member 7 (shown in FIG. 1D); power switch operating member 10 provided slidably along exposure meter 2 to open or close the power switch (not shown); pushbutton 12 for starting light measurement operation when depressed; and diaphragm aperture value display window 14 for displaying a diaphragm aperture value obtained from the light measurement and exposure factor calculations.

Figure 1B:
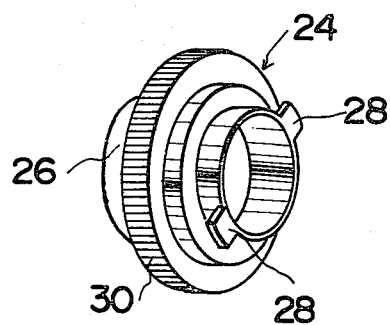
FIG. 1B is a perspective view of an incident light mode attachment which is detachably mounted on the exposure meter of FIG. 1A.
Figure 1C:
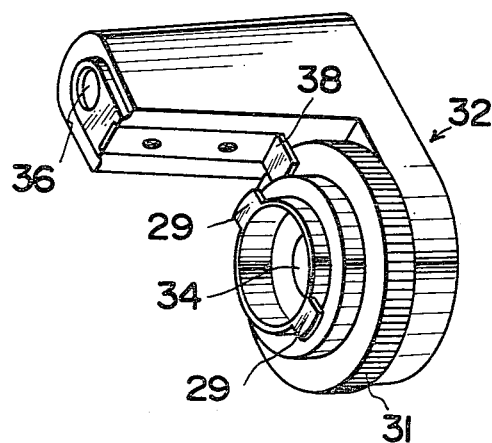
FIG. 1C is a perspective view of a reflected light mode attachment which is detachably mounted on the exposure meter of FIG. 1A.

Light receiving part 3 is provided with mounting portion 16 on which either one of an incident light mode attachment 24 and a reflected light mode attachment 32 shown in FIGS. 1B and 1C, respectively, is selectively and alternatively mountable, and with recess 20 into which positioning member 38 is fittable. Formed on mounting portion 16 is a pair of cutaway portions 18 through which a pair of mounting tabs 28 (shown in FIG. 1B) or a pair of mounting tabs 29 (shown in FIG. 1C) pass. Furthermore, provided on the bottom of mounting portion 16 is a stop mechanism (not shown), e.g., a click-stop mechanism for a pair of mounting tabs 28 and 29 in position when the paired mounting tabs are inserted from cutaway portions 18 into the bottom of mounting portion 16 and rotated by a predetermined angle.

Further, provided on recess 20 is signal pin 22 depressible with positioning member 38 which is provided only on the attachment 32 shown in FIG. 1C. When signal pin 22 remains undepressed, the light measuring and operational circuitry inside exposure meter 2 is set for operation in the incident light mode, but is changed over to reflected light mode operation when signal pin 22 is depressed.

With reference to FIG. 1B, incident light mode attachment 24 includes light receiving ball 26 comprising a hemispherical diffuser, a pair of mounting tabs 28 insertable through a pair of cutaway portions 18 formed on mounting portion 16 of exposure meter 2, and fixing ring 30 with a knurled periphery, which is integrally provided with mounting tabs 28. It should be noted that incident light mode attachment 24 includes no member fittable into recess 20 formed on light receiving part 3 of exposure meter 2.

With respect to FIG. 1C, reflected light mode attachment 32 is provided with a pair of mounting tabs 29 and fixing ring 31, both identical to those provided on incident light mode attachment 24; lens 34 for limiting the angle of acceptance; viewfinder 36 for checking the light measuring range; and positioning member 38. When reflected light mode attachment 32 is mounted on exposure meter 2, positioning member 38 fits into recess 20 of light receiving part 3 to determine the mounting position of reflected light mode attachment 32. Positioning member 38 depresses signal pin 22 provided on recess 20 to push the head of signal pin 22 in the bottom of recess 20. It is to be noted that only fixing ring 31 and a pair of mounting tabs 29 are provided integrally, and rotatable with respect to the other parts of attachment 32 such as positioning member 32.

Figure 1D:
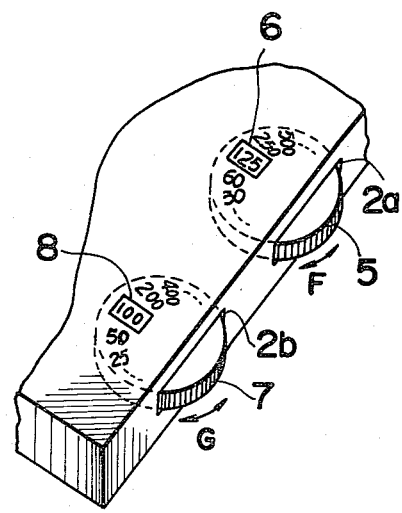
FIG. 1D is a partial perspective view of the exposure meter of FIG. 1A.

FIG. 1D is a partial perspective view of exposure meter 2 of FIG. 1A, when seen from the direction of arrow E, illustrating the setting mechanism for manual setting of an exposure time and the film sensitivity. Disc-shaped manual operation member 5 for setting the exposure time is supported rotatably in the directions of double-headed arrow F and a part thereof projects from opening 2a of exposure meter 2. Additionally, a plurality of settable exposure time values are marked on the top surface of manual operation member 5, and an exposure time is set to an exposure time value at a position corresponding to that shown in exposure time display window 6. Disc-shaped manual operation member 7 for setting film sensitivity is supported rotatably in the directions of double-headed arrow G, and a part thereof projects from opening 2b of exposure meter 2. Furthermore, a plurality of settable film sensitivity values are marked on the top surface of manual operation member 7, and the film sensitivity is set to a film sensitivity value at a position corresponding to that shown in film sensitivity display window 8.

With the above construction, the setting of an exposure time and the film sensitivity to any desired values are possible by means of setting the rotational position of manual operation member 5 and manual operation member 7.

In accordance with the above construction, when the exposure meter is used in the incident light mode, a pair of mounting tabs 28 of incident light mode attachment 24 are fitted into the bottom of mounting portion 16 through a pair of cutaway portions 18, respectively, and then fixing ring 30 formed integrally with mounting tabs 28 is manually rotated. Mounting tabs 28 are also rotated at the bottom of mounting portion 16 and are stopped by a stop mechanism (not shown) when reaching a predetermined position. Thus, incident light mode attachment 24 is mounted on light receiving part 3 of exposure meter 2, and under this condition, signal pin 22 provided on recess 20 remains undepressed, thereby causing the light measuring and operational circuitry to be in the incident light mode.

When the exposure meter is then used in the reflected light mode, positioning member 38 of reflected light mode attachment 32 is first fitted into recess 20 formed on light receiving part 3. Next, as in the case of mounting incident light mode attachment 24, a pair of mounting tabs 29 are fitted into the bottom of mounting portion 16 through paired cutaway portions 18, and fixing ring 31 formed integrally with mounting tabs 29 is rotated manually until mounting tabs 29 are stopped by a stop mechanism (not shown). When reflected light mode attachment 32 is thus mounted on light receiving part 3 of exposure meter 2, positioning member 38 is fitted into recess 20 of light receiving part 3, causing signal pin 22 to be depressed, whereby the light measuring and operational circuitry is changed over to the reflected light mode.

Figure 2:
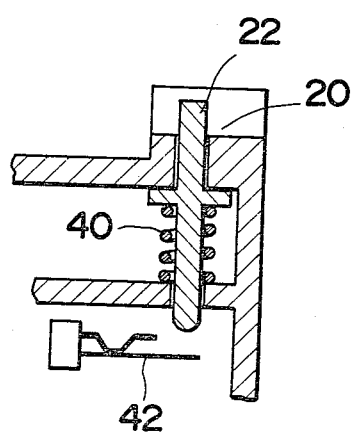
FIG. 2 shows a cross-sectional view of a principal part of the exposure meter of the invention.

FIG. 2 shows a changeover mechanism for changing the light measuring and operational circuitry from incident light mode to reflected light mode operation and vice-versa. Referring to FIG. 2, signal pin 22 is guided to be movable vertically by a predetermined length and is biased upward by spring 40 so that the head thereof projects above recess 20. Changeover switch 42 changes the light measuring and operational circuitry from reflected light mode to incident light mode and vice-versa. Changeover switch 42 is constructed such that it selects the incident light mode for the light measuring and operational circuitry when it is closed, and the reflected light mode when it is open. Changeover switch 42 is so arranged that one contact of a pair of contacts is in the movement locus of signal pin 22, and is opened and closed according to the vertical motion of signal pin 22. Under the condition shown in FIG. 2, switch 42 is closed since signal pin 22 is placed in its topmost position, whereby the light measuring and operational circuitry is in the incident light mode.

As described above, when reflected light mode attachment 32 is mounted on light receiving part 3 of exposure meter 2 with positioning member 38 fitted into recess 20, the head of signal pin 22 is depressed so as to be lowered until signal pin 22 is retracted from recess 20. Thus, the bottom of signal pin 22 depresses one contact alone of changeover switch 42, thereby causing switch 42 to be opened, whereby the light measuring and operational circuitry is changed over to the reflected light mode.

Figure 3:
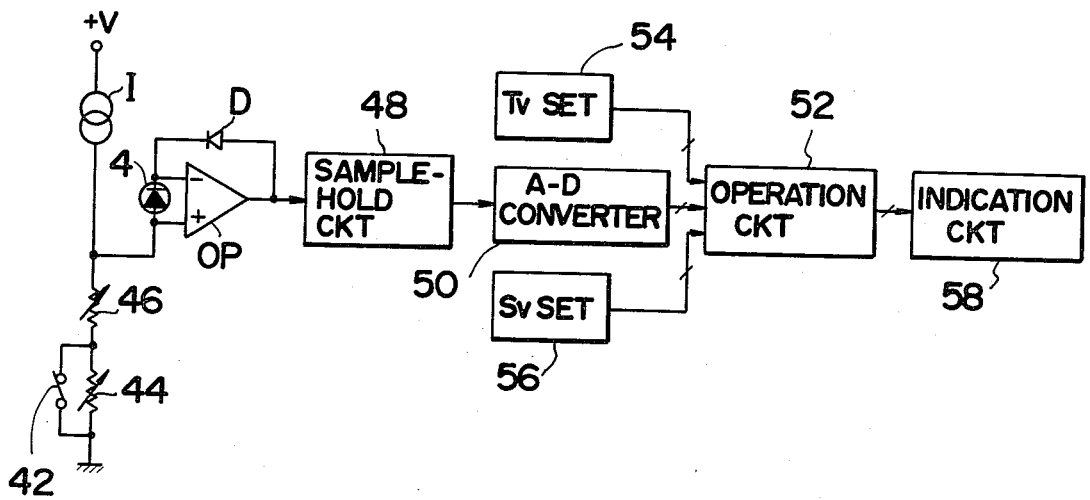
FIG. 3 is a circuit diagram of electric control circuitry used with the exposure meter.

FIG. 3 shows an example of light measuring and operational circuitry changeable to either reflected light mode or incident light mode operation by opening or closing changeover switch 42. Shown in FIG. 3 are constant current supply I, photosensitive element 4 shown in FIG. 1A and changeover switch 42 shown in FIG. 2. Variable resistances 44 and 46 control the output of photosensitive element 4, with variable resistance 44 connected in parallel to changeover switch 42. Also shown are operational amplifier OP, logarithmic compression diode D, sample-hold circuit 48 for holding an input, and analog-digital converter 50 for converting an output of the sample-hold circuit 48 to a digital level. Further shown are exposure time information circuit 54 for generating a digital signal corresponding to an exposure time set by manual operation member 5, and film sensitivity information circuit 56 for generating a digital signal corresponding to a film sensitivity set by manual operation member 7. Light measuring information from analog-digital converter 50, exposure time information from exposure time information circuit 54 and film sensitivity information from film sensitivity information circuit 54 are all input to operational circuit 52, which generates a digital signal in response to a correct diaphragm aperture value for photographing by a camera based on the information received. Based on an output from operation circuit 52, indication circuit 58 indicates a correct diaphragm aperture value on diaphragm aperture value display window 14 of exposure meter 2 shown in FIG. 1A.

With the above construction, when light measurement is in the incident light mode where changeover switch 42 is closed, a bias potential applied to a noninverted input terminal of operational amplifier OP is determined depending on the constant current value of constant-current regulated current source I and the resistance value of variable resistor 46. Conversely, when light measurement is in the reflected light mode where changeover switch 42 is opened, a bias potential applied to a noninverted input terminal of operational amplifier OP is determined depending on the constant current value of constant-current regulated current source I and the combined resistance value of variable resistor 44 and variable resistor 46. Thus, when the quantity of incident light on photosensitive element 4 is equal when in the incident light mode and in the reflected light mode, the output potential of operational amplifier OP in the reflected light mode is set to be larger by a specified level. In either case, the output of operational amplifier OP is logarithmically compressed by logarithm compression diode D and is sent to sample-hold circuit 48 which then holds the output. An output of sample-hold circuit 48 is converted into a digital level by analog-digital converter 50 and is sent to operational circuit 52. Exposure time information from exposure time information circuit 54 and film sensitivity information from film sensitivity information circuit 56 are also sent to operational circuit 52. Based on the above information, operational circuit 52 calculates a suitable diaphragm aperture value under the measured light and the set values and generates a digital signal corresponding to the diaphragm aperture value. An output thereof is sent to indication circuit 58, which digitally displays the diaphragm aperture value on diaphragm aperture value display window 14 of exposure meter body 2.

When used in the incident light mode, incident light mode attachment 24 is mounted on light receiving part 3 of exposure meter 2, as described above. In this condition, signal pin 22 remains undepressed, causing the head of signal pin 22 to project above the recess of light receiving part 3, and changeover switch 42 is closed, causing the light measurement circuit in FIG. 3 to be in the incident light mode. After power switch operating member 10 of exposure meter 2 is operated to close the power switch (not shown), manual operation members 5 and 7 are operated to set the exposure time and the film sensitivity; then exposure time information circuit 54 and film sensitivity information circuit 56 transmit the information to operational circuit 52. Subsequently, the exposure meter is taken to the position of an object, light receiving ball 26 is turned toward the light source, and pushbutton 7 is depressed. This causes the light measuring and operational circuit shown in FIG. 3 to start the light measuring operation, whereby a correct diaphragm aperture value obtained through light measurement in the incident light mode is digitally displayed on diaphragm aperture value display window 14.

When the exposure meter is then used in the reflected light mode, reflected light mode attachment 32 is mounted on light receiving part 3 of exposure meter 2 as described above. Consequently, positioning member 38 of reflected light mode attachment 32 is fitted into recess 20 of light receiving part 3, causing signal pin 22 to be depressed to retract from recess 20, and changeover switch 42 is thereby opened, whereby the light measuring and operational circuitry shown in FIG. 3 is placed in the reflected light mode. After the power switch (not shown) is closed and the exposure time and the film sensitivity are set as in the incident light mode, a desired light measurement portion of an object is checked through viewfinder 36 and pushbutton 7 is depressed. This causes the light measuring and operational circuitry shown in FIG. 3 to start the light measuring operation as previously described, and the diaphragm aperture value obtained through light measurement in the reflected light mode is digitally displayed on diaphragm aperture display window 14.

Thus, the output of operation circuit 52 to be sent to indication circuit 58 is changed by a predetermined degree in response to the operation of switch 42, which is automatically controlled by the exchange between the attachments, for making a suitable indication for the particular attachment used.

Figure 4:
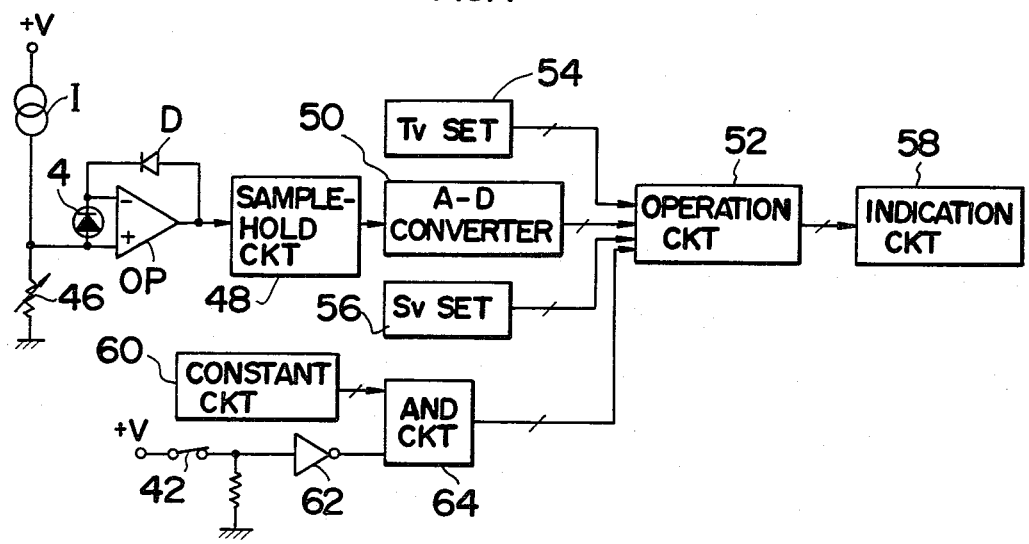
FIG. 4 is a circuit diagram illustrating a modification of the electric control circuitry.

FIG. 4 is a block diagram schematically illustrating another embodiment of a light measuring and operational circuit shown in FIG. 3. The same reference numbers are used for parts corresponding to FIG. 3, and description thereof is omitted. In contrast to the light measuring and operational circuitry shown in FIG. 3, which changes the output of the light measuring circuit to either the incident light mode or the reflected light mode, the light measuring and operational circuitry in FIG. 4 effects such changeover in a stage of operation. Shown in FIG. 4 are constant circuit 60 for generating an output of constant data, and inversion circuit 62. AND circuit 64 shown therein generates a signal output corresponding to "0" when an output from inversion circuit 62 is at a "Low" level and generates the same output as the input from constant circuit 60 when the output from inversion circuit 62 is at a "High" level. The output from AND circuit 64 is sent to operation circuit 52. With respect to the above embodiment, changeover switch 42 is provided at the input terminal of inversion circuit 62 and, unlike the embodiment shown in FIG. 3, no changeover switch 42 is provided between variable resistance 46 and ground terminal, nor is variable resistance 44 connected in parallel to changeover switch 42.

With the above construction, when light measurement is in the incident light mode, changeover switch 42 is closed. The input of inversion circuit 62 is then at a "High" level and the output thereof is switched to a "Low" level, whereby AND circuit 64 generates a signal output corresponding to "0," which is then sent to operation circuit 52. Accordingly, when the light measurement commences after the exposure time and the film sensitivity are set as described above, operation circuit 52 receives light measuring information corresponding to a light measuring value from analog-digital converter 50, exposure time information from exposure time information circuit 54 and film sensitivity information from film sensitivity information circuit 56, respectively, but no information from constant circuit 60. Operation circuit 52 then calculates a correct diaphragm aperture value based on the three sets of received information, thereby displaying a correct diaphragm aperture value in the incident light mode on aperture value display window 14 shown in FIG. 1 through indication circuit 58.

When light measurement is in the reflected light mode, changeover switch 42 is opened. The input of inversion circuit 62 then switches to a "Low" level, and thus the output from inversion circuit 62 switches to a "High" level. As a result, constant information entered from constant circuit 60 is gated from AND circuit 64, and is sent to operational circuit 52. Accordingly, when the light measurement commences after the exposure time and the film sensitivity are set as described above, operational circuit 52 receives information from constant circuit 60, in addition to light measurement information, exposure time information and film sensitivity information to change the output of the operational circuit 52 by a predetermined degree. Operational circuit 52 then calculates a correct diaphragm aperture value based on the four sets of received information and generates a signal output in response thereto. Thus, a correct diaphragm aperture value in the reflected light mode is displayed on diaphragm aperture value display window 14 shown in FIG. 1 through indication circuit 58.

It is to be noted that the above embodiment shows a case of obtaining a correct diaphragm aperture value based on the set exposure time and film sensitivity. However, the present invention is not limited to such an embodiment, but is also applicable to an embodiment designed to obtain a correct exposure time with set diaphragm aperture value and film sensitivity, another embodiment changeable for obtaining a correct diaphragm aperture value and a correct exposure time value, and still another embodiment for obtaining a correct exposure value (Ev value). Furthermore, the present invention is not limited to the above embodiments, but also is applicable to a flash meter circuit using an integral-type light measuring and operational circuit, and the like.

In order to change displays between the light measurement in the reflected light mode and the incident light mode, the embodiment changes the light measuring and operational circuit, but the present invention also enables mechanical changeover in place of an electrical one. For instance, with a prior art system wherein a position of a display window for reading a display value on a rotatable disc-plate is changed manually, a mechanism may be provided to change the position of the display window according to an attachment mounted on the exposure meter.

As described above, an exposure meter according to the present invention is constructed such that it selects a display based on the light measurement in the reflected light mode or the incident light mode, depending respectively on a reflected light mode attachment or an incident light mode attachment mounted on the exposure meter. Therefore, the camera operator requires no conversion table or never misreads the value, or never fails to change the position of the display window. As a result, when using such exposure meter in either the reflected light mode or the incident light mode, readouts of wrong values will never occur.

Furthermore, according to the above embodiment, a light measuring and operational circuitry, for obtaining a display value to be indicated on a display portion, is changed in the reflected light mode or the incident light mode. Thus, an indication value is always readable directly in the aforesaid indicating portion of the exposure meter.

What is claimed is:

1. An exposure meter usable as an incident light meter and as a reflected light meter by selective use of an incident-light measuring attachment and a reflected-light measuring attachment, comprising:
  attachment receiving means for selectively receiving said incident-light measuring attachment and said reflected-light measuring attachment;
  means for receiving light passed through the attachment mounted on said attachment receiving means to give an output in response to intensity of received light;
  means for processing at least the output of said light receiving means to obtain exposure information;
  means for indicating exposure information in response to the information obtained by said processing means;
  means for generating signals in dependence upon the attachment mounted on said attachment receiving means; and means for selecting between indication by incident light measuring and indication by reflected light measuring in response to the signals generated by said means for generating;

whereby, the exposure information for incident light measuring is indicated when said incident-light measuring attachement is mounted on said attachment receiving means, and the exposure information by reflected light measuring is indicated when said reflected-light measuring attachment is mounted on said attachment receiving means.

2. An exposure meter according to claim 1, wherein said means for generating comprises a signal pin capable of being depressed only when a predetermined one of said reflected-light measuring attachment and incident light measuring attachment is mounted on said attachment receiving means.

3. An exposure meter according to claim 1, wherein said means for generating is placed on a portion which operates to provide for mounting said reflected-light measuring attachment on said attachment receiving means.

4. An exposure meter according to claim 1, wherein said indication selecting means comprises means for changing the output of said light measuring means.

5. An exposure meter according to claim 1, wherein said indication selection means comprises means for changing the input of said processing means.

6. An exposure meter according to claim 1, further comprising means for setting the exposure time and the film speed and correspondingly generating outputs indicative thereof, respectively, wherein said processing means processes the outputs of said means for setting with the output of said light receiving means to obtain an aperture value as the exposure information.

7. An exposure meter capable of both incident-light and reflected-light measurements by means of selectively mounting one of an incident-light measuring attachment and a reflected light measuring attachment on the meter, comprising:

means for receiving light through said one of the attachments which is mounted on the meter;

indicating means responsive to said light receiving means for indicating exposure information in one of an incident-light reading mode and a reflected-light reading mode, and including means for displaying the exposure information under the control of an electrical signal; and means for selecting between the indicating modes in said indicating means by detecting whether said incident-light measuring attachment or said reflected-light measuring attachment is mounted on the meter, and including means for distinguishing between said incident-light measuring attachment and said reflected light attachment, and further including means for changing said electrical signal by a predetermined amount in response to the operation of said means for distinguishing.

8. An exposure meter according to claim 7 further comprising means for setting at least one set of exposure information, wherein said indicating means further includes means for producing said electrical signal in response to operation of said light receiving means and said means for setting.

* * * * *